(12) United States Patent
Pasquini

(10) Patent No.: US 12,233,799 B1
(45) Date of Patent: Feb. 25, 2025

(54) VEHICLE SKID PLATE

(71) Applicant: Antonio A. Pasquini, Sarasota, FL (US)

(72) Inventor: Antonio A. Pasquini, Sarasota, FL (US)

( * ) Notice: Subject to any disclaimer, the term of this patent is extended or adjusted under 35 U.S.C. 154(b) by 284 days.

(21) Appl. No.: 17/947,648

(22) Filed: Sep. 19, 2022

(51) Int. Cl.
  *B60R 19/44* (2006.01)
  *B32B 3/26* (2006.01)
  *B32B 5/18* (2006.01)
  *B32B 3/06* (2006.01)

(52) U.S. Cl.
  CPC .............. *B60R 19/44* (2013.01); *B32B 3/266* (2013.01); *B32B 5/18* (2013.01); *B32B 3/06* (2013.01); *B32B 2605/00* (2013.01)

(58) Field of Classification Search
  CPC ....... B60R 19/44; B60R 19/445; B60R 19/48; B60R 19/54
  USPC .......................... 293/102, 117, 120, 121, 142; 296/136.01, 7, 8, 1; 150/166
  See application file for complete search history.

(56) References Cited

U.S. PATENT DOCUMENTS

| | | |
|---|---|---|
| 3,279,557 A | 10/1966 | Halun |
| 10,040,489 B2 | 8/2018 | Baudry et al. |
| 10,266,138 B2 | 4/2019 | Parker |
| 10,272,862 B2 | 4/2019 | Whitehead |
| 11,059,441 B2 | 7/2021 | Whitehead |
| 11,117,626 B2 * | 9/2021 | Salter .................... B60R 19/023 |
| 2019/0217798 A1 | 7/2019 | Soleimanpour |

FOREIGN PATENT DOCUMENTS

| | | | | |
|---|---|---|---|---|
| JP | 6020081 | * | 11/2016 | |
| JP | 6020081 B2 | * | 11/2016 | ....... H01L 21/28581 |

OTHER PUBLICATIONS

JP6020081 Text (Year: 2016).*

* cited by examiner

*Primary Examiner* — Dennis H Pedder
(74) *Attorney, Agent, or Firm* — Bryan L. Loeffler, Esq.; LOEFFLER IP GROUP, P.A.

(57) ABSTRACT

A planar skid plate (1) having specially placed slits (11) that allow the skid plate to conform and seal to three-dimensional contours of a vehicle's exterior surface when pressed against vehicle's exterior surface. The skid plate may be removed without causing damage to the existing finish of the vehicle and without leaving any signs it was ever installed on the vehicle.

8 Claims, 5 Drawing Sheets

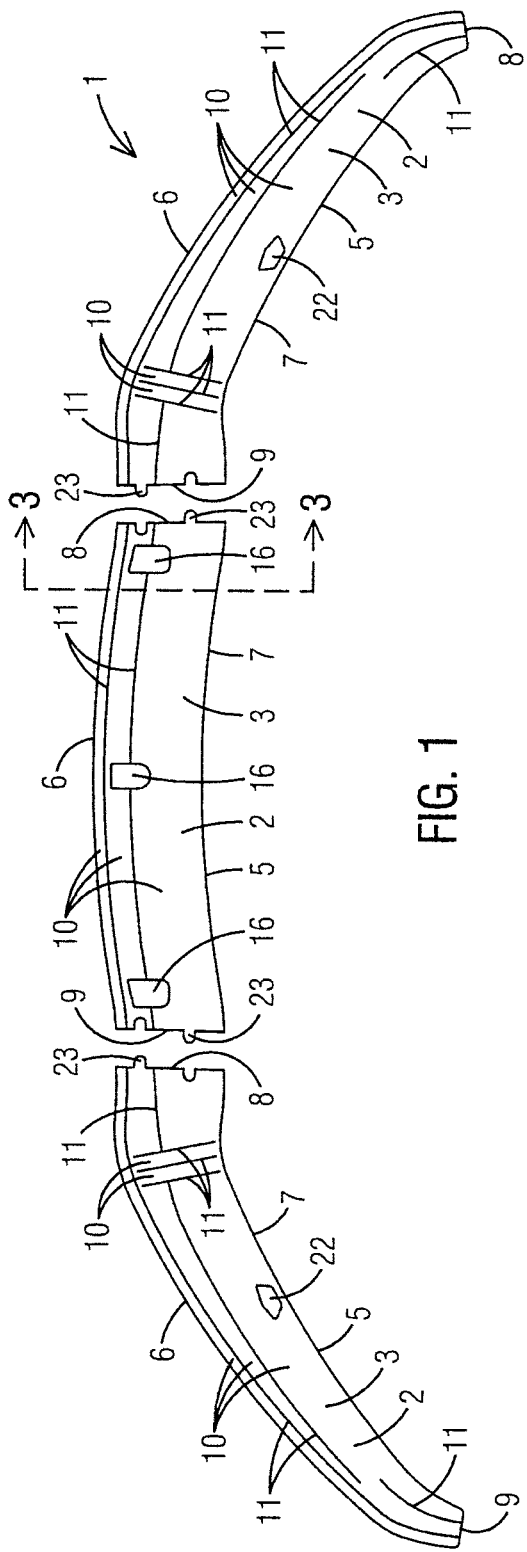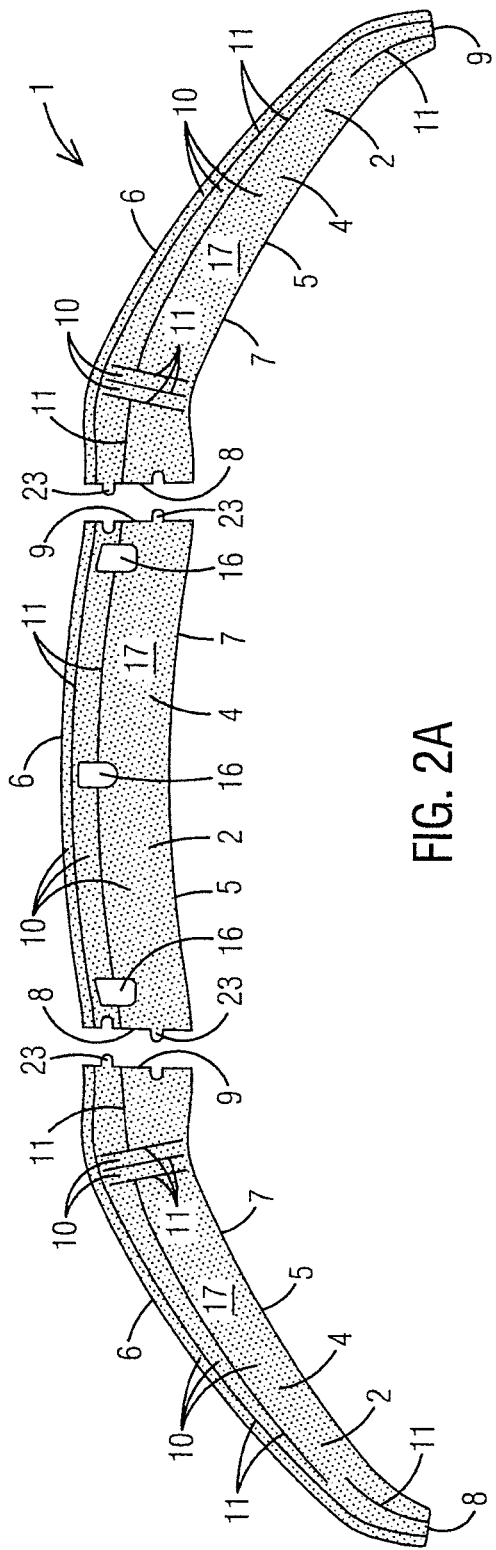
FIG. 1
FIG. 2A (BEFORE)

(AFTER)

VEHICLE SKID PLATE

FIELD OF THE INVENTION

This invention relates to protective devices for vehicle bodies and finishes, and more particularly, to a skid plate constructed from a flat panel that conforms to the three-dimensional contours of a vehicle's surface after being pressed against the vehicle's surface.

BACKGROUND OF THE INVENTION

Skid plates are installed on bumpers and underbodies of sports cars and vehicles having low ground clearances to protect from damage caused by "grounding out," which occurs when a vehicle bumper or body makes contact with a roadway, road debris, speed bump, angled driveway, parking stop, pothole, and other hazards. Conventional skid plates are panels that are preformed using molds to permanently shape the panels to match the contours of a specific make and model of a vehicle. Most conventional skid plates include a single plate that extends from the passenger side of the vehicle to the driver side of the vehicle. In addition to the costs of vehicle specific molds, these pre-formed skid plates are large and bulky, thereby requiring additional costs for storage and shipping.

An additional drawback of conventional skid plates is the limited methods of attachment available for installation. Conventional preformed skid plates must be installed using pre-existing bolt holes with additional new holes for bolts and/or rivets on the vehicle panels and/or vehicle frame. Double-sided adhesive tape may also be used, however, double-sided taped may only be used in a limited capacity due to the curvatures and corners found in pre-formed skid plates. Both conventional attachment methods leave voids between the exterior surface of the vehicle and the skid plate that allows for rubbing between the pre-formed skid plate and the exterior surface of the vehicle. In addition, rocks and/or road debris may find its way through unsealed edges between the skid plate and the vehicle surface.

Therefore, a need exists for a skid plate constructed from a flat panel that conforms to the three-dimensional contours of a vehicle's surface after being pressed against the vehicle's surface and is fully sealed against the surface of the vehicle.

SUMMARY OF THE INVENTION

The primary object of the present invention is to provide a planar skid plate that conforms and seals to the three-dimensional contours of a vehicle's surface when pressed against an exterior surface of the vehicle.

An additional object of the present invention is to provide a planar skid plate that is fully sealed against the surface of the vehicle after installation An additional object of the present invention is to provide a planar skid plate that is aesthetically pleasing and does not detract from the original appearance of a vehicle.

An additional object of the present invention is to provide a planar skid plate that may be removed without damaging the finish of the vehicle or leaving any evidence of ever being installed on the vehicle.

An additional object of the present invention is to provide a planar skid plate that is easy and economical to manufacture, store, ship, and install.

The present invention fulfills the above and other objects by providing a skid plate constructed from a flat panel having a perimeter edge formed to match a horizontal curvature of a bumper. A plurality of specially placed slits on the panel divides the panel into strips that conform to a vertical curvature of a bumper. The panel remains in a substantially flat or "planar" position up until the point of installation, which allows for reduced storage and shipping costs because the skid guards may be mailed or shipped flat, thereby eliminating the need for large shipping boxes. This also allows for more economical manufacturing costs as the cuts or slits may be made using a CNC router table or equivalent cutting system as opposes to molds and forms used to make conventional skid guards.

In addition, the planar surface allows an entire rear surface of a panel to be covered in a double-sided foam adhesive tape, which provides greater contact and adhesion between the skid plate of the present invention and a vehicle surface. Double-sided foam adhesive tape is preferably placed along all perimeter edges to seal the skid plate to the vehicle surface, thereby sealing all of the edges of the skid plate and preventing debris from entering and becoming lodged between the skid plate and the vehicle. The placement of double-sided foam adhesive tape on edges and in the field of the panel also prevents unwanted voids and provides cushioning between the panel and the surface of the vehicle. The use of non-mechanical fasteners allows the skid plate to be removed without causing any damage to the surface or paint of the vehicle.

When pressed against a vehicle surface during installation, the strips on the panel create a series of vertical steps that conform to the vertical curvature of the vehicle wherein the edges of the strips and the perimeter edge are preferably beveled to reduce wind resistance.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a bottom view of a set of skid plates of the present invention configured to fit on a front end of a vehicle;

FIG. 2A is a top view of a set of skid plates of the present invention configured to fit on a front end of a vehicle with no double-sided foam tape installed thereon;

DESCRIPTION OF THE PREFERRED EMBODIMENTS

Figure 2B:
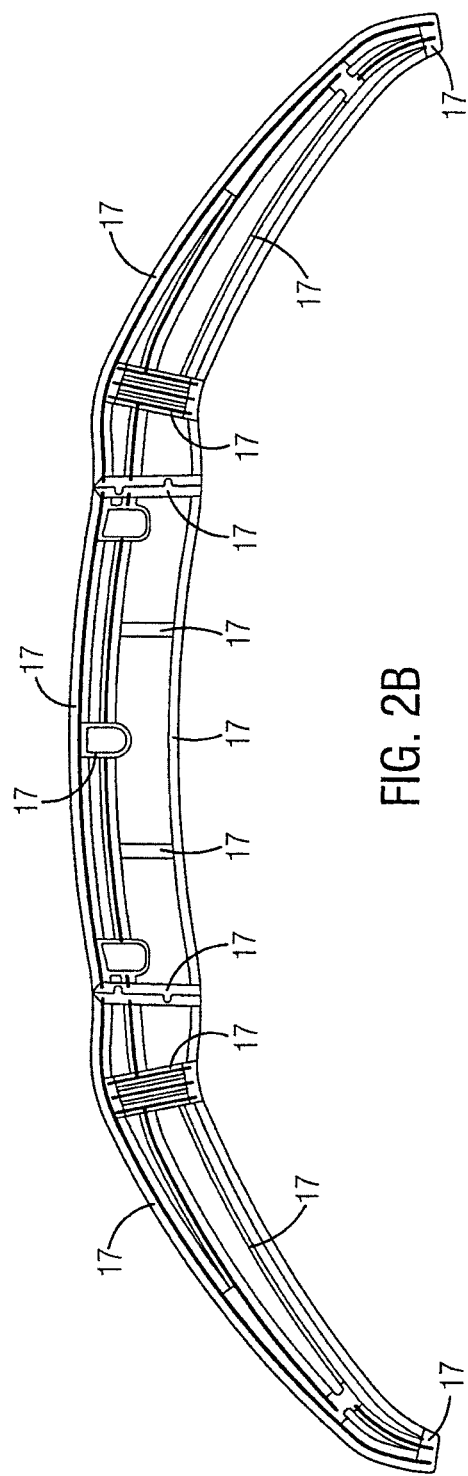
FIG. 2B is a top view of a set of skid plates of the present invention configured to fit on a front end of a vehicle having CAD designed double-sided tape applied thereto.
Figure 3:
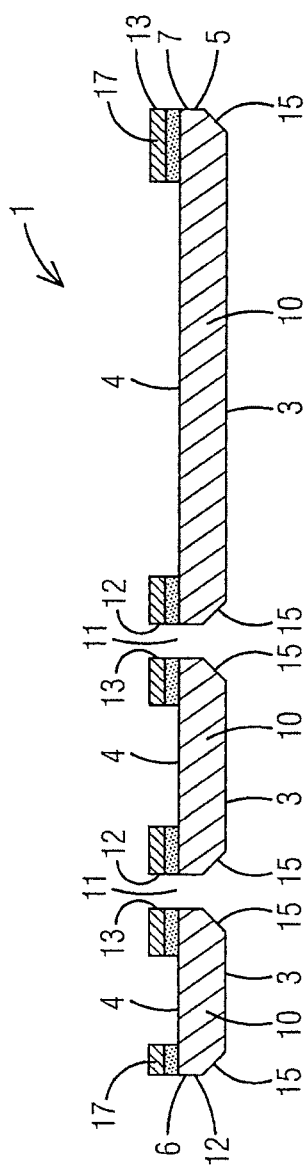
FIG. 3 is sectional side view along Lines 3-3 of FIG. 1.
Figure 5:
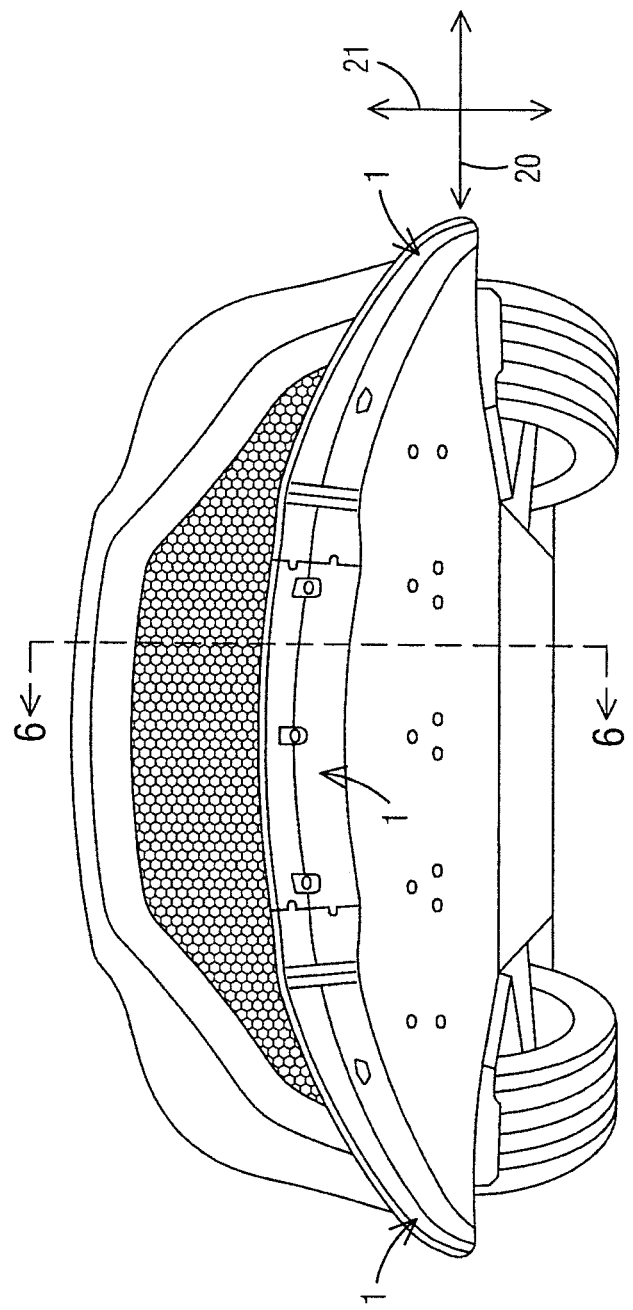
FIG. 5 is a bottom view of a vehicle front end having a set of skid plates of the present invention installed thereon.

For purposes of describing the preferred embodiment, the terminology used in reference to the numbered accessories in the drawings is as follows:

1. skid plate, generally
2. panel
3. bottom surface of panel
4. top surface of panel
5. perimeter edge of panel
6. front edge of panel
7. rear edge of panel
8. driver side edge of panel
9. passenger side edge of panel
10. strip
11. slit
12. front edge of strip
13. rear edge of strip
14. step
15. beveled edge
16. access hole
17. double-sided tape
18. bumper
19. horizontal curvature of bumper
20. vertical curvature of bumper
21. vertical step
22. badge with serial number
23. interlocking tabs With reference to FIGS. 1-3, a bottom, top and sectional side view, respectively, of a set of skid plates 1 of the present invention in an uninstalled planar position are illustrated. Each skid plate 1 comprises a flat or planar panel 2 having a bottom surface 3 and a top surface 4. An outer perimeter edge 5 of each panel 2 comprises a front edge 6, rear edge 7, driver side edge 8, and a passenger side edge 9 cut to match a horizontal profile of a bumper, as illustrated in FIG. 5.

Figure 6:
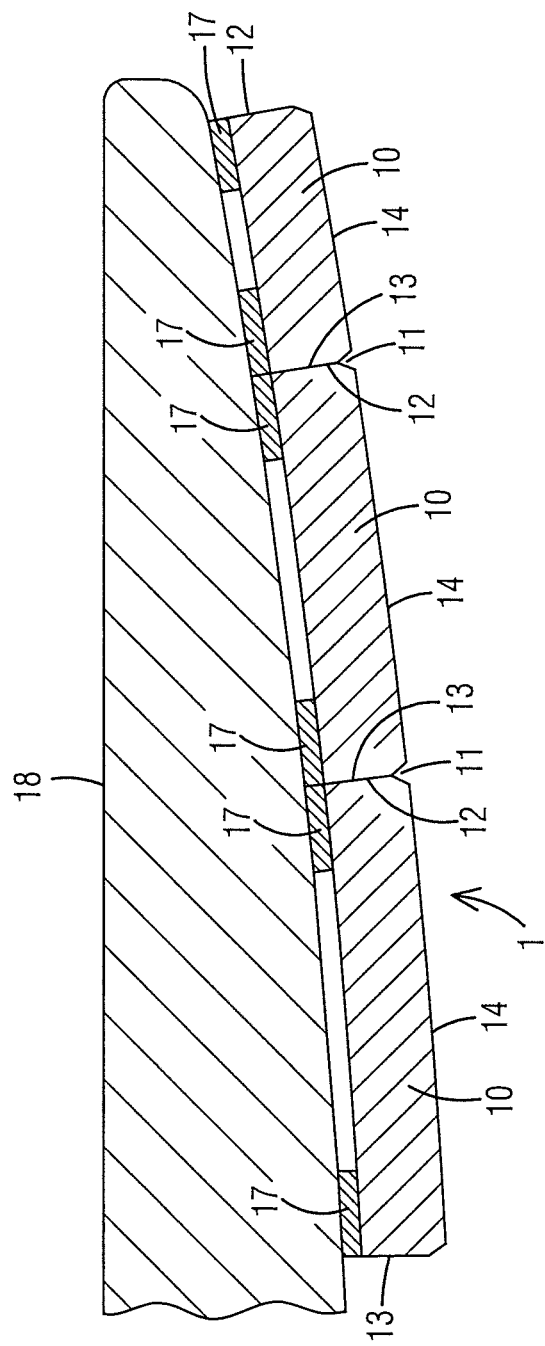
FIG. 6 is sectional side view along Lines 6-6 of FIG. 5 showing a skid plate of the present invention conforming to the vehicle surface.

Each panel 2 further comprises a plurality of strips 10 created by cutting one or more slits 11 in each panel 2, wherein each strip has a front edge 12 and a rear edge 13. A location of each slit 11 is positioned on the panel 2 based on a vertical curvature or side profile of the bumper wherein each slit 11 creates a step 14 between the two adjacent strips 10 that conforms to the vertical curvature of the bumper, as illustrated in FIG. 6.

The resulting step configuration of the strips 10 provides additional reinforcement against wind pressure as the front edge 12 of each strip 10 remains slightly offset against a rear edge 13 of the strip 10 in front of it. Beveled edges 15 on each slit 11 further also reduces wind resistance by forming angled or rounded edges between the front edge 12 and rear edge 13 of each strip 10.

One or more access holes 16 may be located on each panel 2 to provide access to existing bolts on the vehicle so the skid plates 1 do not need to be removed. As illustrated in FIG. 3, a CAD designed double-sided foam adhesive tape 17 is placed on the top surface 4 of the panel 2 and seals the entire perimeter edge 5 to prevent debris from entering between the skid plate 1 and the surface of the bumper. The double-sided foam adhesive tape 17 may have varying widths and/or thicknesses depending on where the double-sided foam adhesive tape 17 is placed on the skid plate 1.

Interlocking tabs 23 are preferably located on side edges of the skid plates 1 when multiple skid plates 1 are placed side-by-side or edge-to-edge.

Figure 4:
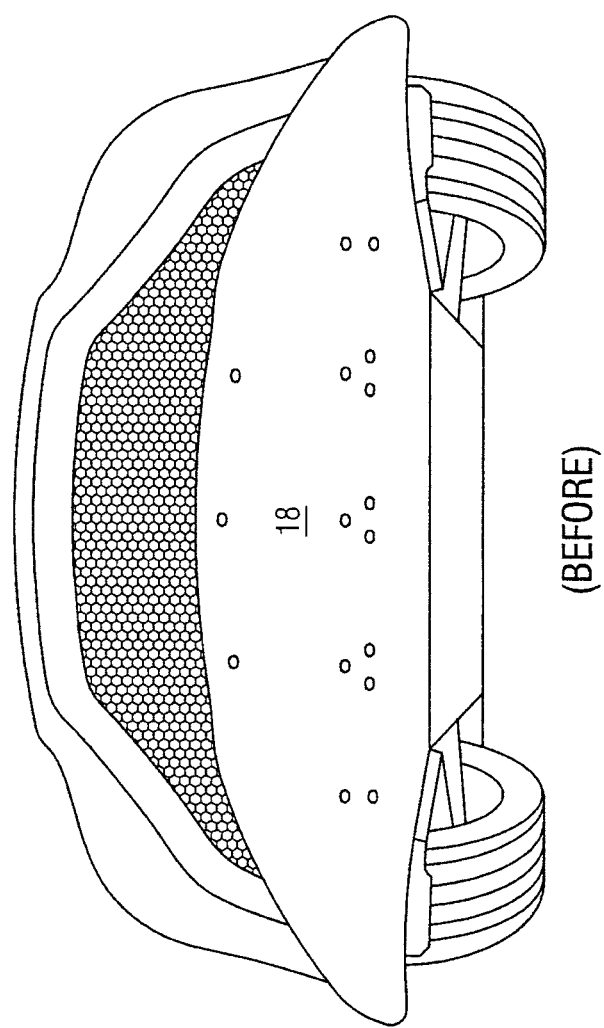
FIG. 4 is a bottom view of a vehicle front end prior to installation of a set of skid plates of the present invention.

With reference to FIGS. 4-6, an installation of a set of skid plates 1 of the present invention on a bumper 18 is illustrated. The skid plate 1 is constructed from a flat panel 2 having a perimeter edge 5 formed to match a horizontal curvature 20 of a bumper 18, as illustrated in FIGS. 4 and 5. A plurality of specially placed slits 11 on each panel 2 divides the panels 2 into strips 10 that conform to a vertical curvature 21 of the bumper 18 when pressed against the bumper 18.

The panel 2 remains in a substantially flat or "planar" position up until the point of installation, which allows for reduced storage and shipping costs.

When pressed against the bumper 18 during installation, the strips 10 create a series of vertical steps 14 that conform to the vertical curvature 20 of the bumper wherein, as illustrated in FIG. 6. The front edge 12 of each strip 10 preferably remains slightly offset against a rear edge 13 of the strip 10 in front of it. The edges 12, 13 of each strip are preferably beveled to reduce wind resistance. A badge with a serial number 22 or other identifying indicia may be placed on the skid plates 1 to prove authenticity, to track ownership, to track warranty information, to look up applicable make and model of vehicle, and so forth.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A protective skid plate for a vehicle comprising:
   a panel having a bottom surface and a top surface;
   said panel having an outer perimeter edge with a front edge, a rear edge, a driver side edge, and a passenger side edge;
   said panel having a plurality of slits on the panel that divide the panel into strips with each strip having a front edge and rear edge; and
   wherein the strips abut each other, thereby making the strips capable of conforming around a curved vehicle surface when pressed against the curved vehicle surface.

2. The protective skid plate of claim 1 further comprising:
   an adhesive double sided foam tape located on the top surface of the panel for securing the panel to the curved vehicle surface.

3. The protective skid plate of claim 2 wherein:
   said double sided adhesive foam tape is located around the entire perimeter edge of the panel; and
   said double sided adhesive foam tape is located on the entire front edge and rear edge of each strip.

4. The protective skid plate of claim 2 wherein:
   said double sided adhesive foam tape covers the entire top surface of the panel.

5. The protective skid plate of claim 1 wherein:
   said front edge of each strip has a beveled edge.

6. The protective skid plate of claim 1 wherein:
   said rear edge of each strip has a beveled edge.

7. The protective skid plate of claim 1 wherein:
   said perimeter edge has a beveled edge.

8. The protective skid plate of claim 1 further comprising:
   at least one access hole located on said panel.

* * * * *